United States Patent [19]

McClurg et al.

[11] 4,111,393
[45] Sep. 5, 1978

[54] BALL VALVE SEAT ASSEMBLY HAVING A REMOVABLY MOUNTED FACE SEAL INSERT

[75] Inventors: William E. McClurg, Stafford; Charles C. Partridge, Houston, both of Tex.

[73] Assignee: ACF Industries, Incorporated, New York, N.Y.

[21] Appl. No.: 817,391

[22] Filed: Jul. 20, 1977

[51] Int. Cl.$^2$ .............................................. F16K 25/00
[52] U.S. Cl. .................................. 251/174; 251/315; 251/317
[58] Field of Search ............... 251/174, 315, 317, 363, 251/171

[56] References Cited

U.S. PATENT DOCUMENTS

| | | | |
|---|---|---|---|
| 2,466,098 | 4/1949 | Grebmeier | 251/174 |
| 2,529,412 | 11/1950 | Parker | 251/174 |
| 3,293,342 | 12/1966 | Grove | 251/174 X |
| 3,472,270 | 10/1969 | Masheder | 251/174 X |

*Primary Examiner*—Harold W. Weakley
*Attorney, Agent, or Firm*—Eugene N. Riddle

[57] ABSTRACT

A ball valve seat assembly has a seat ring with an annular recess around an inner annular portion thereof and a resilient seat ring insert mounted in the recess. The seat ring has a radially outwardly extending groove located within the recess. The insert has a radially outwardly extending retaining flange which is engaged in the seat ring groove to anchor the insert. The insert is sufficiently deformable to be radially inwardly deformed temporarily as the flange is moved through the interior of the seat ring and into the groove. The insert has a face portion that is sealingly engaged with the ball valve member. The seat ring and the insert are biased toward the ball valve member and a peripheral seal is provided around the seat ring to seal with the valve body. The seat pocket inner side extends in an overlying relation to a portion of the insert in order to prevent radially inward movement of the insert. In one construction an O-ring is compressed in the seat pocket against the seat ring and the insert to urge them toward the valve member and to seal around the seat ring. In another construction an O-ring seal is provided around the perimeter of the seat ring and springs are used to bias the seat member toward the ball valve member.

8 Claims, 7 Drawing Figures

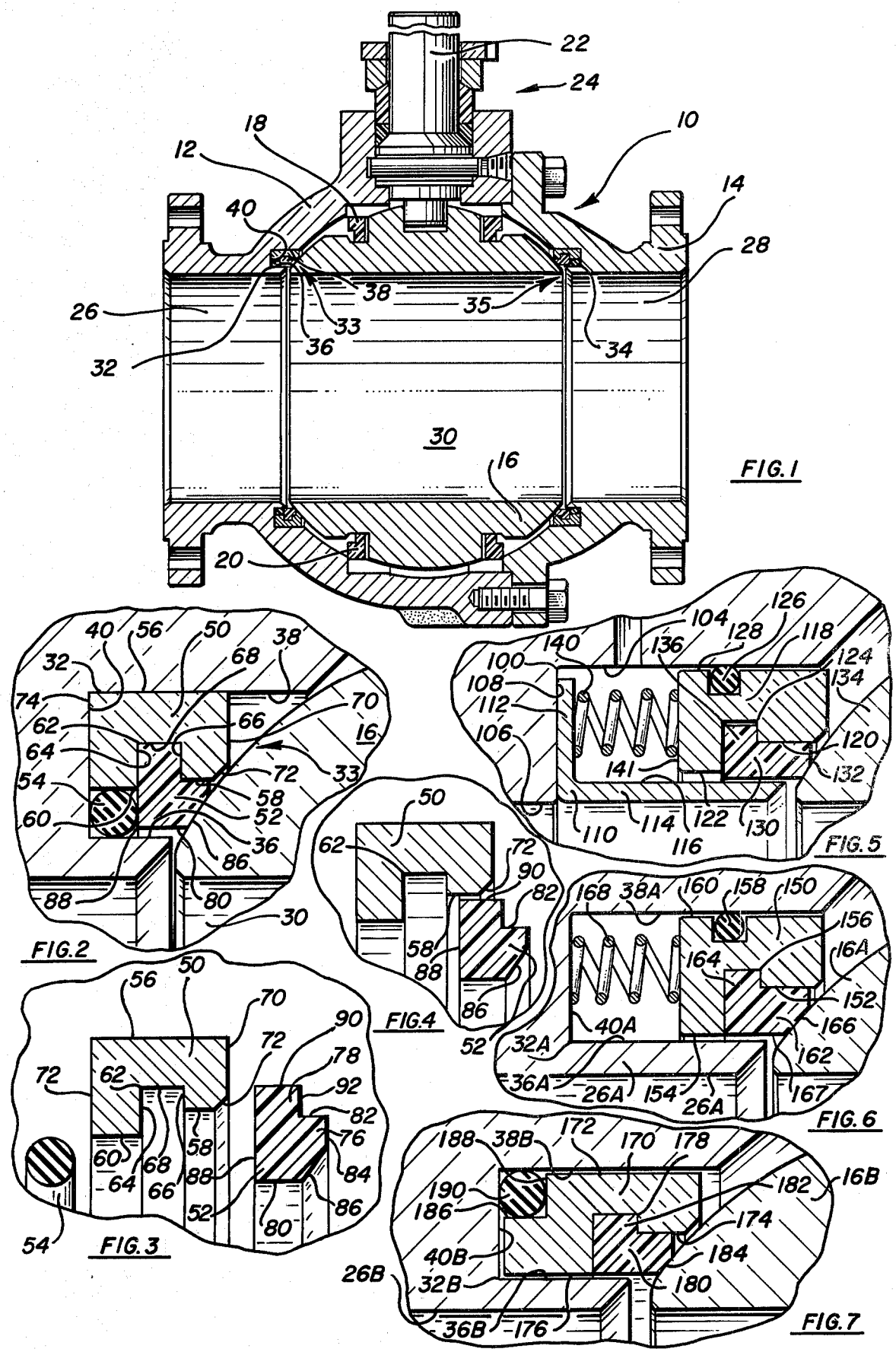

BALL VALVE SEAT ASSEMBLY HAVING A REMOVABLY MOUNTED FACE SEAL INSERT

BACKGROUND OF THE INVENTION

This invention is related to seat assemblies for ball valves which are constructed so that the face seal is removable. More specifically this invention is related to a ball valve seat assembly which has a seat ring that mounts in the valve body and a face seal insert which is removably mounted in the seat ring.

In the prior art numerous valve seat constructions are known which have removable face seals, however, in these constructions the face seal is merely one side of a resilient seat ring. In these constructions the complete seat is removed and replaced for repair of the valve. One example of this is the patent of Freeman et al, U.S. Pat. No. 2,945,666 issued July 19, 1960, and another example is the patent of Lowery, U.S. Pat. No. 3,226,080 issued Dec. 28, 1965. Another typical type of seat construction is a metallic seat ring which has a non-metallic face seal element clamped, crimped, or otherwise secured such that replacement of the seal element requires also the replacement of the supporting ring. One example of this construction is the patent of Colby et al, No. 3,460,802 issued Aug. 12, 1969. Each of these prior art constructions have their own peculiar disadvantages. In the case of the completely elastomeric seat ring, it is generally used only in the smaller sizes of valve such as (4) inches, approximately (100) millimeters and in relatively low pressure applications because of physical characteristics of the elastomer. In the other construction where the resilient seal element is physically retained by the metallic seat ring, this is generally used in the higher pressure applications and usually in larger sizes. The disadvantage in this type of seat is in the expense of repairing the seat assembly. Generally in this second type only the seal element wears out and needs to be replaced, however, the seal element and the seat ring both must be replaced due to the unit like construction.

SUMMARY OF THE INVENTION

In one embodiment this seat assembly has a metal seat ring with an annular recess around an inner portion and a groove within the recess in the seat ring which opens toward the interior of the seat ring. A resilient insert is mounted in the recess and secured by an outwardly extending retaining flange which is engaged in the groove to anchor the insert. The seat ring is biased toward the ball valve member and a peripheral seal is provided around the seat ring to give a fluid-tight seal in the valve body.

In other embodiments of the seat assembly of this invention the basic assembly described above is provided with a stepped interior surface so an O ring contacts both the interior of the seat ring and the insert. In another embodiment the O-ring is mounted around the outer perimeter of the seat ring. In other embodiments springs are employed to bias the seat ring toward the valve member and an O-ring is provided around the outer perimeter of the seat ring to seal around it inside the valve body.

One object of this invention is to provide a seat assembly for a ball valve which has a removably mounted face seal insert which will allow the valve to be repaired by simply replacing the face seal insert thus facilitating easy and relatively economical field repair.

Still another object of this invention is to provide a ball valve seat assembly which has a seat ring with an internal groove which receives and mounts a seat insert in a snap-in relation.

Various other objects, advantages, and features of this invention will become apparent to those skilled in the art from the following discussion, taken in conjunction with the accompanying drawings, in which:

DESCRIPTION OF THE DRAWINGS

FIG. 1 is a cutaway elevation view of a ball valve having a trunnionmounted ball valve member and utilizing the seat construction of this invention;

FIG. 2 is an enlarged cross-sectional fragmentary view of a portion of the valve and the seat assembly shown in FIG. 1;

FIG. 3 is an exploded cross-sectional elevation view of the seat ring, O-ring, and insert shown in FIG. 2 with these elements in the same coaxial relation to each other as their position when they reside in the valve;

FIG. 4 is an enlarged cross-sectional view of the seat ring and the insert with the insert being deflected radially inward relative to the seat ring in the installation process and the outer perimeter of the insert sliding over an inner portion of the seat member;

FIG. 5 is a cross-sectional view of a portion of a ball valve employing another embodiment of the seat assembly of this invention including a seat pocket formed between a recess around a flow passageway and a seat pocket insert member, and the seat assembly with a spring to urge the seat ring and the insert toward the ball valve member;

FIG. 6 is an enlarged fragmentary view of a portion of a ball valve illustrating another embodiment of the seat assembly of this invention wherein a spring is provided to bias the seat member toward the ball valve and a peripherally mounted O ring seals around the outside of the seat ring; and FIG. 7 is an enlarged fragmentary view of a portion of a ball valve illustrating another embodiment of the seat assembly of this invention wherein an O-ring is mounted around the outer perimeter of the seat member at one end thereof to serve as a seal and to bias the seat ring and the insert toward the ball valve member.

The following is a discussion and a description of preferred specific embodiments of the ball valve seat assembly of this invention, such being made with reference to the drawings, whereupon the same reference numerals are used to indicate the same or similar parts and/or structure. It is to be understood that such discussion and description is not to unduly limit the scope of the invention.

DETAILED DESCRIPTION

FIG. 1 shows a ball valve employing the novel seat assembly of this invention. This ball valve is a typical trunnion-mounted style ball valve and has a valve body indicated generally at 10 which is comprised of a main body portion 12 and a removably mounted tailpiece 14. The interior of valve body 10 defines the valve chamber which encloses a ball valve member 16. The ball valve member is supported by upper and lower trunnion blocks 18 and 20l respectively. Ball valve member 16 is rotated by a stem 22 which extends through a packing assembly indicated generally at 24 on what is shown as the upper side of the valve. A slot in the ball valve member and a tang on the end of stem 22 couple the stem and ball valve member so rotating stem 22 directly rotates ball valve member 16. A flow passageway 26 through valve body main portion 12 connects with one side of the valve chamber and another flow passgeway 28 through tailpiece 14 communicates with the opposite side of the valve chamber to permit fluid flow through the ball valve member passageway 30. A seat pocket 32 is provided in the valve body main portion 12 around passageway 26 at the valve chamber. Correspondingly on tailpiece 14 another seat packet indicated generally at 34 is provided around passageway 28 at the valve chamber. Seat pocket 32 has substantially parallel inner and outer opposed sides 36 and 38 which are joined by an end wall 40 that generally faces ball valve member 16. Seat pocket 34 is constructed similar to seat pocket 32 and includes opposed inner and outer sides 42 and 44 and end wall 46. Seat pockets 32 and 34 individually retain the respective seat assemblies 33 and 35 in the proper position for sealing against ball valve member 16.

FIG. 2 shows seat assembly 33 and its associated seat pocket 32 in an enlarged fragmentary view with portions of the valve body and the ball valve member. Seat assembly 33 includes a seat ring 50, a seat insert 52 mounted in the interior of seat ring 50, and an O-ring 54 also mounted in the interior of the seat ring. Seat ring 50 has a generally smooth outer cylindrical surface 56 and a first and second inner peripheral surface 58 and 60. The first and second inner peripheral surfaces are separated by a groove 62. Groove 62 extends generally radially outward or perpendicular relative to the elongated axis of the associated flow passgeway and is defined by substantially parallel sides 64 and 66 joined by an end 68 which is transverse to the sides. The interior of the seat ring is constructed with first inner peripheral surface 58 being adjacent to ball valve member 16 and having a smaller diameter than second inner peripheral surface 60. The front side of seat ring 50 which is adjacent to the ball valve member has an outer peripheral portion 70 that is substantially perpendicular to outer peripheral surface 56 and which joins a chamfered inner peripheral surface 72 that connects this end with first inner peripheral surface 58. The rear or back end of seat member 56 has a substantially flat surface 74 connecting outer peripheral surface 56 and second inner peripheral surface 60.

FIG. 3 shows seat insert 52 in enlarged detail in a position separated from other parts of the seat assembly. Seat insert 52 has a cross-sectionally angled shape with a leg portion 76 generally aligned with the flowline in the direction of the flow passageway and a radially outwardly extending flange 78 on one end thereof. Seat insert 52 has an inner peripheral surface 80 which is generally parallel to inner and outer sides of the seat pocket and generally parallel to a stepped surface 82 on the opposite side of insert leg portion 76. Seat insert 52 has an inner end 84 which is generally radially disposed relative to the plane of the insert and joins surface 82 on the inner periphery and a face surface 86 on the outer periphery thereof. Face surface 86 contacts the exterior surface of ball valve member 16 and joins seat insert inner peripheral surface 80. Seat insert 52 has an outer radially disposed side surface 88 which forms one side of flange 76 and one end of leg portion 78 and joins inner peripheral surface 80 with a flange outer peripheral surface 90. Flange 78 extends radially outward of leg portion 76 and is defined in part by the outer peripheral portion of side 88, outer peripheral surface 90 and another side surface 92 parallel to surface 88 and connecting outer peripheral surface 90 with leg portion outer surface 82. The width of flange 78 is selected so that flange sides 88 and 92 will easily move between groove sides 64 and 66 upon mounting of the seat insert. The radial dimension of flange 78 is selected in relation to the groove depth so the flange will be enclosed in the seat ring grooves with seat ring surface 58 being in contact with insert surface 82 and seat ring surface 68 lying adjacent to seat insert surfce 90 when the insert is installed in the seat ring.

This seat assembly is constructed with the seat ring 50 being essentially rigid and insert 52 being sufficiently flexible to permit flange 78 to be temporarily deformed and inserted into seat ring groove 62 by simply snapping seat insert 52 into the groove. Seat insert 52 is necessarily constructed of a material such as an elastomeric or an easily deformable plastic which is sufficiently deformable to permit a temporary deformation thereof without damaging effects so that it can be directly inserted into the groove.

FIG. 4 illustrates a portion of the insert installation process. Initially seat insert 52 is placed on the inner or forward end portion of seat ring 50 with the corner between sides 88 and 90 placed on the seat ring face portion 72. Seat insert 52 is then pressed toward groove 62 so the insert is deformed radially inward with the corner sliding on the conically shaped surface 72 so that flange outer peripheral surface 90 will move into contact with first inner peripheral surface 58. Continued pressure on seat insert 52 will slide flange outer peripheral surface 90 over the seat member first inner peripheral surface 58 until these surfaces disengage whereupon the resilient action of seat insert 52 will displace itself radially outward with flange 78 moving into groove 62. It is to be noted that removal of seat insert 52 from seat member 50 can be done by inserting a pointed tool such as a common screw driver between surfaces 82 and 58. Rotating the screw driver and displacing it in an angular relation to the flange will displace flange 78 from groove 62 onto surface 58 thereby allowing seat insert 52 to be removed from the interior of seat ring 50. Because of the simplicity of changing the seat insert a valve employing this seat construction can have the seal element easily and rather quickly replaced in a field environment.

FIG. 2 shows a completed seat assembly installed in a ball valve. Seat ring 50 rests in the seat pocket with its outer peripheral surface 56 adjacent the seat pocket outer side 38 and with seat member rear side 74 adjacent the seat pocket bottom or end wall 40. Seat insert 52 is mounted in seat ring 50 with a flange 78 engaged in groove 62 and with O-ring 54 located in a cross-sectionally rectangular compartment located around inner peripheral portion of the seat ring in the interior of the seat pocket. Seat pocket inner side 36 extends over a mid-portion of insert 52 to prevent radially inward displacement of the insert that would be sufficient to displace insert flange portion 78 from seat ring groove 62. Insert inner peripheral surface 80 is spaced a small distance from seat pocket inner side 36 to permit assembly of the valve and to accommodate any radially inward expansion of the insert caused by initial loading of the valve. O-ring 54 is normally compressed between seat pocket end wall 40 and seat insert side 88 in the direction generally aligning with the flow passageway and it is also compressed between seat pocket inner side 36 and seat member second stepped peripheral surface 60 in the transverse direction. The compression of O-ring 54 between seat pocket end wall 40 and seat insert 52 serves to bias the seat insert along with the seat ring toward ball valve member 16. Compression of O-ring 54 in the transverse direction provides fluid sealing between the valve body as defined by the seat pocket and an inner peripheral portion of seat assembly. O-ring 54 is selected of sufficiently large diameter to provide substantial biasing of seat ring 50 and seat insert 52 toward ball valve member 16 so that a fluid-tight seal is achieved between seat insert face portion 86 and the spherical exterior surfaces of ball valve member 16. Because ball valve member 16 is supported by trunnion blocks 18 and 20 it rotates about an essentially fixed axis thus the contact pressure between seat insert 52 and the ball valve member is substantially constant and due to the loading of O-ring 54. Obviously line pressure and fluid pressure in the valve chamber influence the contact pressure between seat insert 52 and ball valve member 16, but the initial seal is provided by compression loading of O-ring 54.

For the valve shown in FIG. 1 when equipped with seat assemblies of this invention on both the upstream and downstream sides thereof, the valve will normally seal on the upstream side. In the following consider passageway 26 on the upstream side of the valve. Fluid pressure from upstream passageway 26 will enter the seat pocket 32 and exert fluid pressure on O-ring 54 and seat insert 52. Pressure an O-ring 54 will displace it radially outwardly within the confines of the cross-sectionally rectangular compartment in which it is located thereby further assisting in biasing seat insert 52 and seat ring 50 toward ball valve member 16 and increasing the contact pressure on seat insert face 86. The valve normally seals on the upstream side, however, in the event of substantially complete failure of the upstream seal, the downstream seat assembly provides a back-up or secondary seal for the valve.

FIG. 5 illustrates another embodiment of the novel seat construction of this invention. In this embodiment the seat pocket 100 is formed in valve body 102 by an outer peripheral seat pocket surface 104 oriented generally parallel to the axis of the flow passageway 106, and seat pocket end wall surface 108 generally perpendicular to the elongated axis of flow passageway 106. A seat pocket insert 110 has a radially disposed leg portion thereof 112 extending outward from a longitudinally disposed leg portion 114. The interior of leg portion 114 defines the seat pocket inner peripheral wall 116 which is substantially parallel to seat pocket outer peripheral wall 104. Radially disposed leg portion 12 rests in the bottom of the seat pocket with one side against surface 108. The seat member 118 is an annular member having first and second inner peripheral surfaces 120 and 122 separated by groove 124. First inner peripheral surface 120 has a larger diameter than second inner peripheral surface 122. An O-ring is mounted in a groove around the outer perimeter of seat 118 in the outer peripheral surface 128. A seat insert 130 is mounted in groove 124 and extends over first inner peripheral seat surface 120 and has a face surface 132 resting in contact with the spherical exterior of ball valve member 134. Seat insert 130 is constructed substantially the same as the seat insert described above including a radially outwardly extending flange 136 extending into groove 124 and securing the insert. A spring 140 is positioned inside the seat pocket between seat pocket insert leg 112 and the back side 141 of seat 118 to urge the seat and the insert toward ball valve member 134 and maintain seat insert 130 in sealing contact with the exterior of ball valve member. It is to be noted that seat pocket insert leg 114 extends over a substantial portion of seat insert 130 to prevent the insert from being radially inwardly displaced sufficiently to remove flange 136 from groove 124.

In operation the seat assembly shown in FIG. 5 functions substantially the same as the seat assembly described above. One advantage to the seat assembly shown in FIG. 5 is that sophisticated tooling is not required to make a parallel sided seat pocket. The utilization of a single spring or a plurality of springs around the seat assembly to urge seat 118 toward the ball valve member provides a convenient medium for adjusting and regulating the bias on the seat by selection of the spring or springs. It should be noted that when a valve using this embodiment of the seat assembly is in use in the open position and fluid pressure in the valve chamber increases significantly above the fluid pressure in the flowline, then the seat assemblies will relieve this excess body pressure by venting it to the flowline. When the valve is in the closed position and this situation occurs, then the seat assembly on the downstream or lower pressure side of the valve will relieve the excess pressure.

FIG. 6 illustrates one further embodiment of the novel seat construction of this invention. In FIG. 6 the seat pocket is formed substantially the same as the seat pocket shown in FIGS. 1 and 2, therefore, it is illustrated with the same numerals followed by the capital letter "A". Seat 150 is formed somewhat like the seat shown in FIG. 5 with first and second inner peripheral surfaces 152 and 154 spaced apart by a groove 156 with first inner peripheral surface 152 having a larger diameter than second peripheral surface 154. An O-ring 158 is mounted around the outer peripheral surface 160 of seat 150. A seat insert 162 is mounted in the inner portion of seat 150. Seat insert 162 has a radially outwardly extending flange 164 engaged in groove 156 and a seat face 166 on one side thereof engaged with the spherical surface of ball member 16A. The seat insert rests on outer surface seat ring first inner peripheral surface 152. Seal inner surface 167 lies in a spaced relation to the seat pocket inner side wall 36A. A spring 168 is mounted in seat pocket 32A between the back side of seat 150 and seat pocket end wall 40A to bias the seat and the insert toward the ball valve member. A plurality of coil springs such as spring 168 can be utilized or in the alternative a plurality of wave type springs will accomplish the same result. In operation the seat assembly shown in FIG. 6 functions substantially the same as the other seat assemblies described above.

FIG. 7 illustrates an additional embodiment of the seat assembly of this invention. In FIG. 7 the valve body seat pocket construction and the ball valve member are the same as shown and described in FIG. 1 and 2 and for this reason these parts of the structure have the same numerals as used with FIGS. 1 and 2 followed by the capital letter "B". The seat assembly shown in FIG. 7 includes a seat member 170 mounted in seat pocket 32B and having a uniform outer peripheral surface 172 and first and second stepped inner peripheral surfaces 174 and 176. The first inner peripheral surface 174 has a larger diameter than second stepped inner peripheral surface 176. The inner peripheral surfaces 174 and 176 are separated by a groove 178. Groove 178 is a parallel sided groove extending radially outward relative to first and second peripheral surfaces 174 and 176. A seat insert 180 is mounted in groove 178. Seat insert 180 includes a radially outwardly extending flange portion 182 mounted in groove 178 and a face portion 184 in sealing contact with ball member 16B. Seat member 170 has a reduced diameter outer portion on the back side thereof. This reduced diameter portion has a reduced outer peripheral surface 186 which is of a smaller diameter than seat outer peripheral surface 172 thereby forming an outer seat radially disposed peripheral surface 188. An O-ring 190 is mounted around this reduced diameter portion in contact with surfaces 186, 188, 38B, and 40B to provide a seal around the seat member inside the seat pocket. O-ring 190 not only provides a seal but is sized sufficiently large that it is compressed upon assembly of the valve so that it biases seat member 170 toward the ball valve member 16B to firmly engage insert face 184 in sealing contact with the exterior of ball valve member 16B.

In operation the seat assembly shown in FIG. 7 functions substantially the same as the above described seat assemblies. Insert 180 provides a face seal around the ball valve member 16B and O-ring 190 provides a seal between the seat member 170 and the interior of the seat pocket. It is to be noted that the seat assembly of this embodiment will relieve excess body pressure to the flowline similar to the seat assemblies shown in FIGS. 5 and 6. This body pressure relieving feature is due to the placement of O-ring 190 in relation to the face seal portion of insert 180.

Each of the above described embodiments of this invention have the novel seat insert which snaps into or otherwise engages a groove in the seat member. This unique construction of the seat assembly permits the face seal element to be easily installed and moreover easily replaced.

What is claimed is:

1. A ball valve comprising:
   (a) a valve body having inlet and outlet flow passageways connected by a valve chamber, a ball valve member mounted in said valve chamber for rotation between open and closed positions relative to said passageway;
   (b) a seat pocket in said valve body around each of said passageways defined by substantially parallel inner and outer sides which are joined by an end wall that generally faces said ball valve member;
   (c) a seat ring in said pocket having an outer periphery adjacent the outer side of the pocket and an inner periphery defined by first and second generally parallel inner peripheral surfaces facing the inner side of said pocket, said first and second peripheral surfaces being spaced from each other longitudinally relative to the flow passageway and defining therebetween an annular groove which opens toward the longitudinal axis of the passageways, said groove being defined by generally parallel opposed sides joining said first and second peripheral sufaces and extending generally transverse to the longitudinal axis of the passageways;
   (d) a resilient seat ring insert mounted inside the seat ring extending over said second inner peripheral surface and including a face portion in sealing contact with said ball valve member and an outer peripheral retaining flange received within said groove, said insert being sufficiently deformable during assembly of the ball valve to permit a radially inward deformation thereof to displace said flange through the interior of said seat ring in order to engage said flange in said groove; and
   (e) means within said seat pocket to bias said seat ring toward said ball valve member.

2. The seat assembly of claim 1, wherein:
   (a) said flange has a significantly larger outer diameter than said inner peripheral surfaces such that said flange will lockingly engage said groove;
   (b) said insert being sufficiently deformable in assembly of said seat assembly to permit a radially inward deformation thereof to displace said flange past one of said inner peripheral surfaces to engage said flange in said groove; and
   (c) said seat pocket inner side extends in an overlying relation to an interior portion of said insert in order to in use prevent radially inward displacement of said insert and disengagement of said flange from said groove.

3. The seat assembly of claim 1 wherein said first inner peripheral surface has a substantially smaller inner peripheral diameter than said second inner peripheral surface and said insert abuts the groove side adjacent said first inner peripheral surface.

4. The seat assembly of claim 1, wherein:
   (a) said first inner peripheral surface having a substantially smaller diameter than said second inner peripheral surface;
   (b) said means to bias being an O-ring of substantially large diameter to contact said seat pocket inner side, said seat pocket end wall, said insert, and said seat ring first inner peripheral surface and to be compressed between said seat pocket end wall and said insert to bias said seat ring along with said insert toward said ball valve member; and
   (c) said O-ring providing a fluid tight seal between said seat ring, said insert and said seat pocket.

5. The seat assembly of claim 3, wherein:
   (a) said seat ring has a groove around said outer periphery with an O-ring mounted in this groove; and
   (b) said means to bias is a spring compressed between said seat ring and said seat pocket end wall.

6. The seat assembly of claim 5, wherein:
   (a) said seat pocket inner side and said end wall are comprised of a seat pocket insert member having a generally cylindrically shaped side portion generally aligned with the associated passageway forming said seat pocket inner side and an end portion transverse to said associated passageway forming said end wall; and
   (b)1 said seat pocket insert side portion extends over an inner peripheral surface of said insert in order to in use prevent radially inward displacement of said insert and disengagement of said flange from said groove.

7. The seat assembly of claim 3, wherein:
   (a) said seat ring has a reduced diameter portion of said outer periphery thereof around the end opposite to said ball valve member;
   (b) said means to bias being an O-ring of substantially large diameter to contact said seat pocket outer side, said seat pocket end wall, and said seat ring and be compressed between said seat pocket end wall and said seat ring to bias said seat ring toward said ball valve member; and
   (c) said O-ring providing a fluid tight seal between said seat and said seat pocket.

8. A ball valve comprising:

(a) a valve body having inlet and outlet flow passageways connected by a valve chamber, a ball valve member mounted in said valve chamber for rotation between open and closed positions relative to said passageways;

(b) a seat pocket in said valve body around each of said passageways defined by substantially parallel inner and outer sides which are joined by an end wall that generally faces said ball valve member;

(c) a seat ring in said pocket having an outer periphery adjacent the outer side of the pocket and a stepped inner periphery defined by first and second generally parallel inner peripheral surfaces facing the inner side of the pocket and an annular groove therebetween, said first peripheral surface being of a smaller diameter than said second peripheral surface, said peripheral surfaces being spaced from each other longitudinally along the flow passageways from said second peripheral surface, said annular groove being defined by generally parallel opposed sides joining the adjacent first and second peripheral surfaces which extend generally transverse to the longitudinal axis of the passageways;

(d) a resilient seat ring insert mounted inside the seat ring including a face portion in sealing contact with said ball valve member and an outer peripheral retaining flange received within said groove, said insert being sufficiently deformable during assembly of the ball valve to permit a radially inward deformation thereof to displace said flange through the interior of said seat ring in order to engage said flange in said groove; and (e) means within said seat pocket to bias said seat ring toward said ball valve member.

* * * * *